(12) United States Patent
Candan et al.

(10) Patent No.: US 7,054,931 B1
(45) Date of Patent: May 30, 2006

(54) SYSTEM AND METHOD FOR INTELLIGENT LOAD DISTRIBUTION TO MINIMIZE RESPONSE TIME FOR WEB CONTENT ACCESS

(75) Inventors: Kasim Selcuk Candan, Mountain View, CA (US); Wen-Syan Li, Fremont, CA (US)

(73) Assignee: NEC Corporation, Tokyo (JP)

( * ) Notice: Subject to any disclaimer, the term of this patent is extended or adjusted under 35 U.S.C. 154(b) by 1035 days.

(21) Appl. No.: 09/703,121

(22) Filed: Oct. 31, 2000

Related U.S. Application Data

(60) Provisional application No. 60/230,564, filed on Aug. 31, 2000.

(51) Int. Cl.
*G06F 15/173* (2006.01)

(52) U.S. Cl. ............... 709/226; 709/223; 709/224; 709/225; 709/203; 709/240; 709/235

(58) Field of Classification Search ............... 709/203, 709/235, 226, 240, 223, 224, 225, 236; 455/453, 455/452.2; 370/209
See application file for complete search history.

(56) References Cited

U.S. PATENT DOCUMENTS

| | | | | |
|---|---|---|---|---|
| 5,924,116 | A * | 7/1999 | Aggarwal et al. | 711/122 |
| 6,052,718 | A * | 4/2000 | Gifford | 709/219 |
| 6,175,869 | B1 * | 1/2001 | Ahuja et al. | 709/226 |
| 6,256,675 | B1 * | 7/2001 | Rabinovich | 709/241 |
| 6,298,381 | B1 * | 10/2001 | Shah et al. | 709/228 |
| 6,314,465 | B1 * | 11/2001 | Paul et al. | 709/226 |

\* cited by examiner

*Primary Examiner*—Ario Etienne
*Assistant Examiner*—Sahera Halim
(74) *Attorney, Agent, or Firm*—Foley & Lardner LLP

(57) ABSTRACT

A content delivery system having m servers, $S'=\{S_1, \ldots, S_m\}$, n active customers, $C'=\{C_1, \ldots, C_n\}$, and g geographic locations, $G'=\{G_1, \ldots, G_g\}$ is disclosed, wherein $sdel_k$ is a server delay of server $S_k$, $ndel_{j,k}$ is a network delay observed by customers in geographic location $G_j$ while retrieving content from server $S_k$, $p_j$ is a priority value for customer $C_i$, $c_i$ is a total load of customer $C_i$, $u_{i,j}$ is a fraction of requests coming to customer $C_i$ from region $G_j$, $a_{i,j,k}$ is a mapping representing a fraction of requests coming to customer $C_i$ from region $G_j$ that have been redirected to server $S_k$, and $s_k$ represents a load capacity of server $S_k$. Within such a system, a method for distributing server loads includes the steps of representing an average prioritized observed response time as $$AORT = \frac{\sum_{i=1}^{n}\sum_{j=1}^{g}\sum_{k=1}^{m} a_{i,j,k} \times u_{i,j} \times c_i \times p_i \times (sdel_k + ndel_{j,k})}{\sum_{i=1}^{n} c_i \times p_i},$$

and then generating a mapping that assigns requests from customers to a particular server while minimizing AORT. A heuristic algorithm is used to generate the mapping, wherein large $a_{i,j,k}$ values are assigned to small $u_{i,j} \times c_i \times (sdel_k + ndel_{j,k})$ values to produce a smaller overall AORT value.

32 Claims, 5 Drawing Sheets

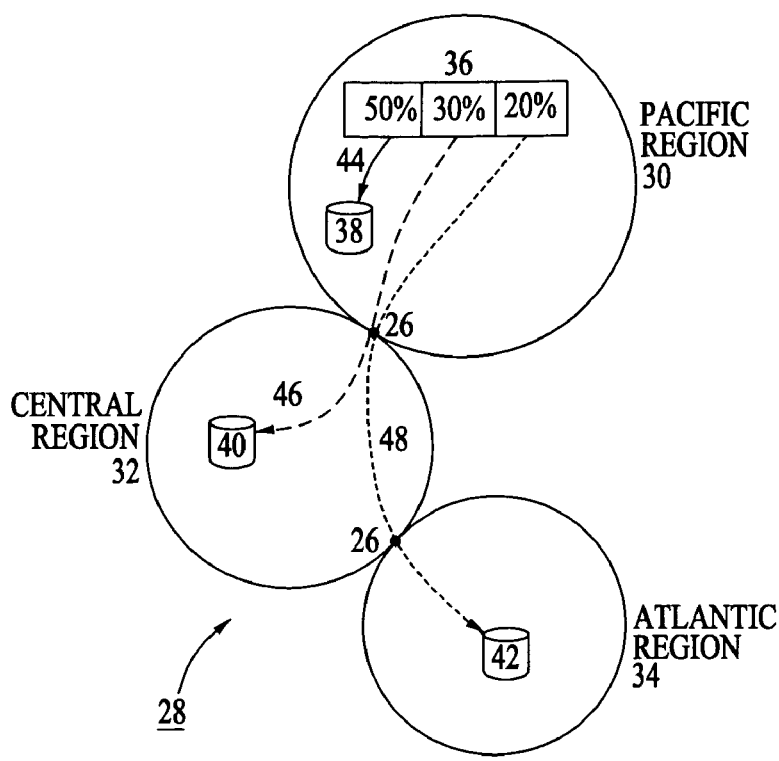
fig.3
fig.4
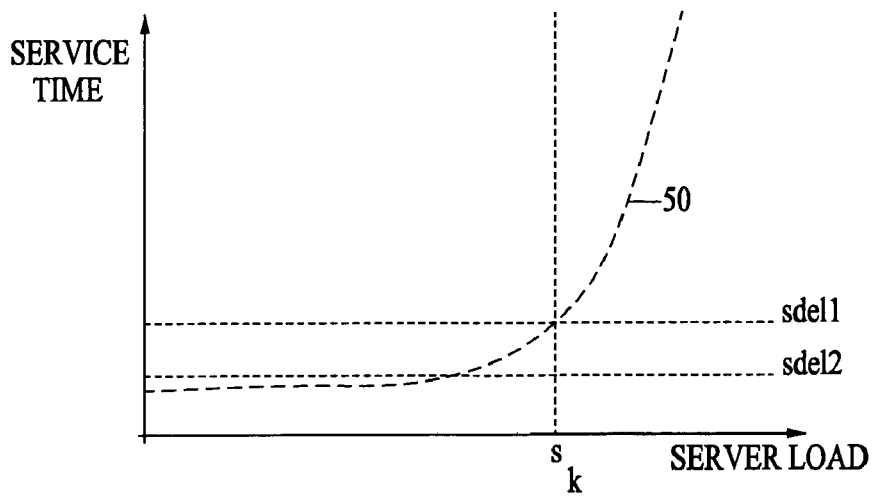

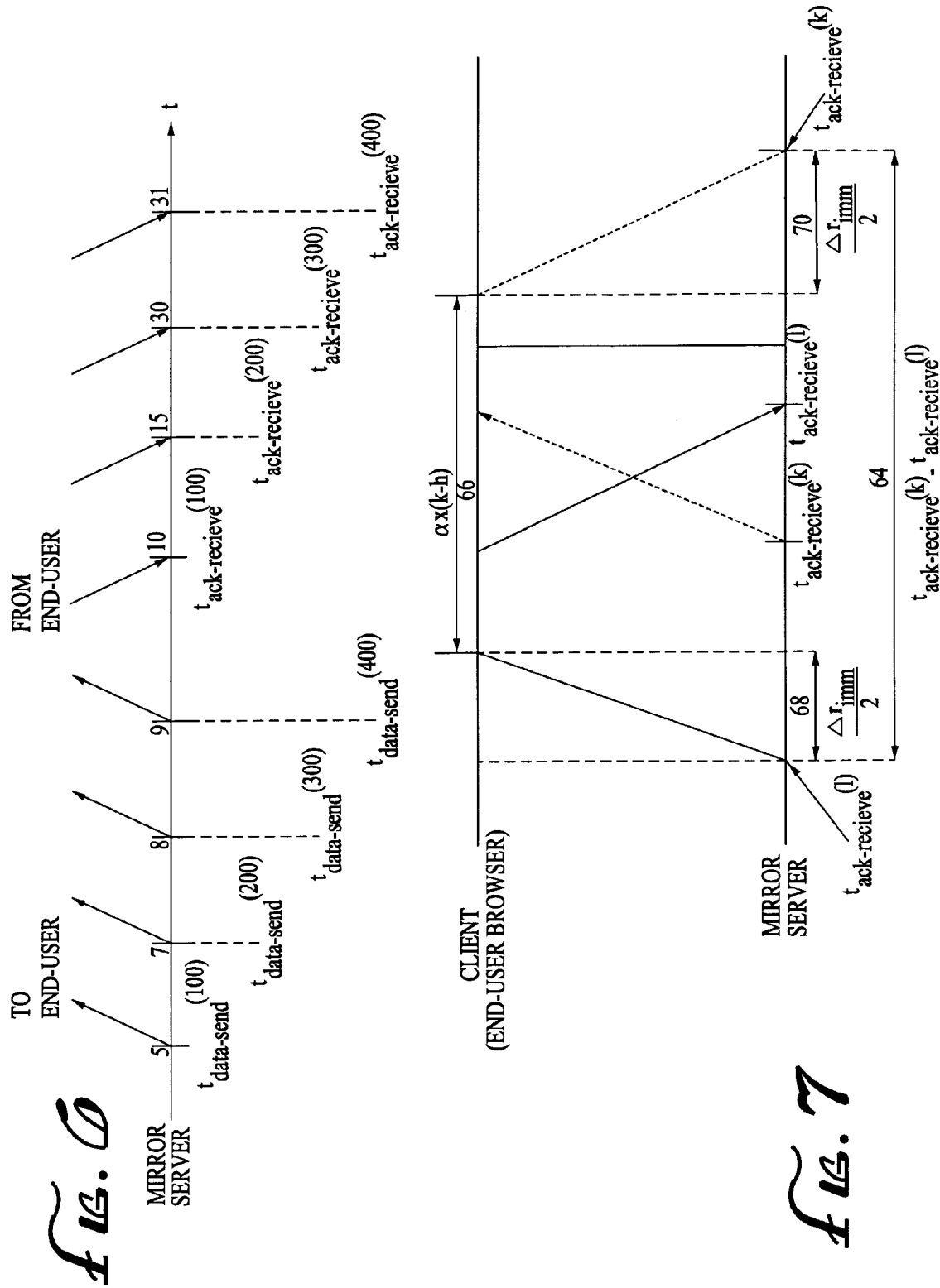

SYSTEM AND METHOD FOR INTELLIGENT LOAD DISTRIBUTION TO MINIMIZE RESPONSE TIME FOR WEB CONTENT ACCESS

CROSS-REFERENCE TO RELATED APPLICATIONS

Embodiments of the present invention claim priority from U.S. Provisional Application Ser. No. 60/230,564 entitled "Intelligent Load Distribution to Minimize User Response Time for Web Content Access," filed Aug. 31, 2000. The content of this application is incorporated by reference herein.

BACKGROUND OF THE INVENTION

1. Field of the Invention

The present invention relates, generally, to content delivery systems, and, in preferred embodiments, to systems and methods for intelligently distributing content provider server loads to minimize user response times for accessing Web content.

2. Description of the Related Art

As illustrated in FIG. 1, a conventional content delivery network 10 typically includes a plurality of end-users 16 (client browsers) and a plurality of content provider servers 18 distributed over a large wide area network 14, such as the Internet. The wide area network 14 may include smaller networks 20, which may roughly correspond to various geographic regions around the world. When, for example, end-user A makes a request 22 for content (e.g. html pages and embedded objects) from a content provider server 18, the content provider server 18 may then deliver the requested content back to end-user A. However, due to delays incurred as the request and content pass through multiple networks 20 and gateways 26, the overall response time seen by end-user A may be quite slow.

Overall response time is comprised of two elements, network delay and server delay. Network delay is the delay incurred as requests and content pass through various networks and gateways at the network boundaries, as described above. Server delay is the delay in processing once the server actually receives the request. There are often trade-offs between these two delay elements.

Mirror servers have been used to improve the performance of the Web as observed by the end-users. (It should be understood that mirror servers 12, as defined herein, may also include proxy servers and cache.) As illustrated in FIG. 2, in a conventional content delivery system 10 employing mirror servers 12, content from a content provider server 18 is copied into one or more of the mirror servers 12. Thereafter, for example, if end-user A sends a request 22 to content provider server 18 for that content, the request may be redirected (see reference character 24) to a mirror server B that stores a copy of that content. Because the mirror server is often located geographically (or logically) close to the requesting end-user, network delays, and therefore overall response times, may be reduced. However, the location and load of the mirror server often plays a large role in determining the actual response times seen by the requesting end-user.

As a result, two approaches have been used to reduce response times, one based on location, the other based on load. The location-based approach divides the wide area network 14 or Internet into regions, often organized around the multiple networks 20 that form the Internet. Powerful mirror servers 12 are then located in each region. In the example of FIG. 2, mirror server B is located in region C. This approach aims to reduce the network delay observed by the end-users 16 by redirecting content requests to mirror servers 12 located geographically (or logically) close to the end-users 16.

In conventional content delivery systems employing a location-based approach, all end-users within a particular region will be redirected to a mirror server in that region. Such content delivery systems are constrained by regional boundaries, and do not allow an end-user to be redirected to a mirror server in another region. Ordinarily, this limitation produces fast overall response times, because the network delays incurred in crossing over regional boundaries are avoided. However, this limitation may actually lead to higher overall response times if the mirror server becomes overloaded.

For example, suppose the requests of many end-users 16 in region A have been redirected to mirror server B, as illustrated in FIG. 2. Although network delays may be minimized by such a mapping, if the number of requests exceeds the load capacity for mirror server B, the server delay of mirror server B may increase dramatically, and overall response times may become very slow. Assume also, for purposes of illustration only, that a neighboring region D contains mirror server E, which also stores a copy of the requested content, but has received few requests for content, and thus has minimal server delay. In this example, although it would actually reduce the overall average response time for all end-users in region C if some of the end-users in region C were redirected to mirror server E in region D, the regional limitations of conventional location-based approaches will not allow it.

Conventional load-based approaches, on the other hand, aim to distribute the load on all mirror servers evenly to prevent any single mirror server from becoming overloaded. Content delivery systems employing a load-based approach do not consider regional boundaries. Rather, such systems maintain statistics from actual requests, and attempt to balance mirror server loads based on these statistics so that all mirror servers see an approximately equivalent load.

Load-based approaches assume negligible network delays, but such an assumption is not necessarily true. Ordinarily, load balancing produces fast overall response times, because all of the mirror servers are experiencing a reasonable load, and therefore server delays are minimized. However, load balancing may actually lead to high network delays and higher overall response times if end-user requests are redirected across regional boundaries in order to balance the mirror server loads. It should be noted that location-based approaches to content delivery systems may also employ load balancing techniques within each region.

Nevertheless, as reported in the literature, both approaches work reasonably well when the Web objects stored in the mirror servers are large (such as images and streaming media), although the overall response times of large objects are extremely sensitive to the network conditions. When the object sizes are smaller ($\leq$ about 4 kB), as it is in the case of most dynamic content, overall response times are less sensitive to the network delays, unless the delivery path crosses geographic location barriers. In contrast, however, dynamic content is extremely sensitive to mirror server loads, as the underlying databases or backend systems are generally not very easy to scale up, and can become bottlenecks.

SUMMARY OF THE DISCLOSURE

Therefore, it is an advantage of embodiments of the present invention to provide a system and method for redirecting end-users to mirror servers in the same region as the requesting end-user, or other regions, using assignments that minimize the overall response time seen by users of the content delivery system.

It is a further advantage of embodiments of the present invention to provide a system and method for redirecting end-users to mirror servers using assignments that balance the loads of the mirror servers while taking into account load capability.

It is a further advantage of embodiments of the present invention to provide a system and method for redirecting end-users to mirror servers in the same region as the requesting end-user, or other regions, using assignments that minimize the overall response time seen by users of the content delivery system, wherein an increase in resources due to the addition of a new mirror server or the service termination of a customer content provider will not cause a load redistribution unless load balancing constraints are violated.

It is a further advantage of embodiments of the present invention to provide a system and method for redirecting end-users to mirror servers in the same region as the requesting end-user, or other regions, using assignments that minimize the overall response time seen by users of the content delivery system, wherein a new customer content provider will be added only if the overall response time is maintained below a specified threshold.

It is a further advantage of embodiments of the present invention to provide a system and method for redirecting end-users to mirror servers in the same region as the requesting end-user, or other regions, using assignments that minimize the overall response time seen by users of the content delivery system, wherein changes to the loads or existing customers will not change the overall response time so significantly that it exceeds a specified threshold.

These and other advantages are accomplished according to a content delivery system having m servers, $S'=\{S_1, \ldots, S_m\}$, n active customers, $C'=\{C_1, \ldots, C_n\}$, and g geographic locations, $G'=\{G_1, \ldots, G_g\}$, wherein $sdel_k$ is a server delay of server $S_k$, $ndel_{j,k}$ is a network delay observed by customers in geographic location $G_j$ while retrieving content from server $S_k$, $p_j$ is a priority value for customer $C_i$, $c_i$ is a total load of customer $C_i$, $u_{i,j}$ is a fraction of requests coming to customer $C_i$ from region $G_j$, $a_{i,j,k}$ is a mapping representing a fraction of requests coming to customer $C_i$ from region $G_j$ that have been redirected to server $S_k$, and $s_k$ represents a load capacity of server $S_k$. Within such a system, a method for distributing server loads includes the steps of representing an average prioritized observed response time as $$AORT = \frac{\sum_{i=1}^{n} \sum_{j=1}^{g} \sum_{k=1}^{m} a_{i,j,k} \times u_{i,j} \times c_i \times p_i \times (sdel_k + ndel_{j,k})}{\sum_{i=1}^{n} c_i \times p_i},$$

and then generating a mapping that assigns requests from customers to a particular server while minimizing AORT. A heuristic algorithm is used to generate the mapping, wherein large $a_{i,j,k}$ values are assigned to small $u_{i,j} \times c_i \times (sdel_k + ndel_{j,k})$ values to produce a smaller overall AORT value.

These and other objects, features, and advantages of embodiments of the invention will be apparent to those skilled in the art from the following detailed description of embodiments of the invention, when read with the drawings and appended claims.

BRIEF DESCRIPTION OF THE DRAWINGS

FIG. 3 illustrates a content delivery network according to preferred embodiments of the present invention in which end-users (client browsers) within a particular region are redirected to request content from mirror servers located in the same region as the end-users or other regions, using assignments that minimize overall response time.

FIG. 4 is a graph illustrating the linearity of server load below a certain threshold.

FIG. 6 is a timeline illustrating an example of information stored in the TCP logs indicating the times at which certain bytes of data have been sent to the client browser, and the times at which acknowledgement for certain bytes of data has been received from the client browser.

FIG. 7 illustrates a graphical representation of how the TCP information of FIG. 6 can be used to estimate per-byte delays according to embodiments of the present invention.

DETAILED DESCRIPTION OF PREFERRED EMBODIMENTS

Figure 1:
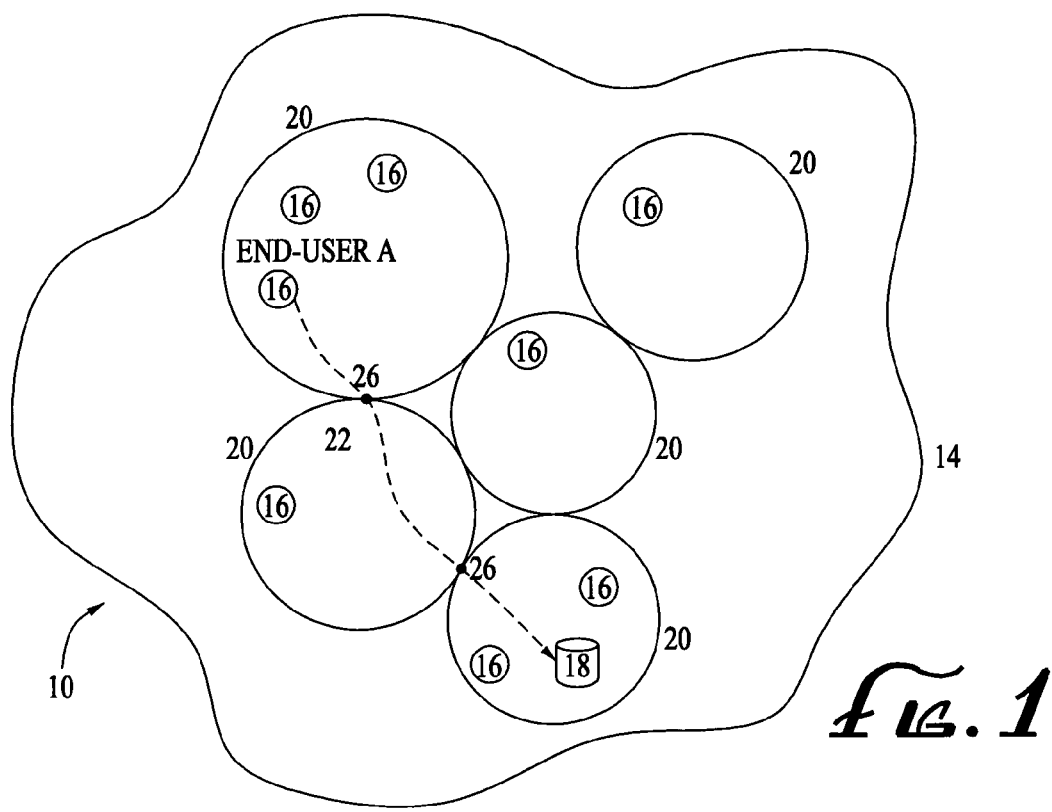
FIG. 1 illustrates a conventional content delivery network in which an end-user (client browser) requests content from a content provider server located in another region through multiple gateways.
Figure 2:
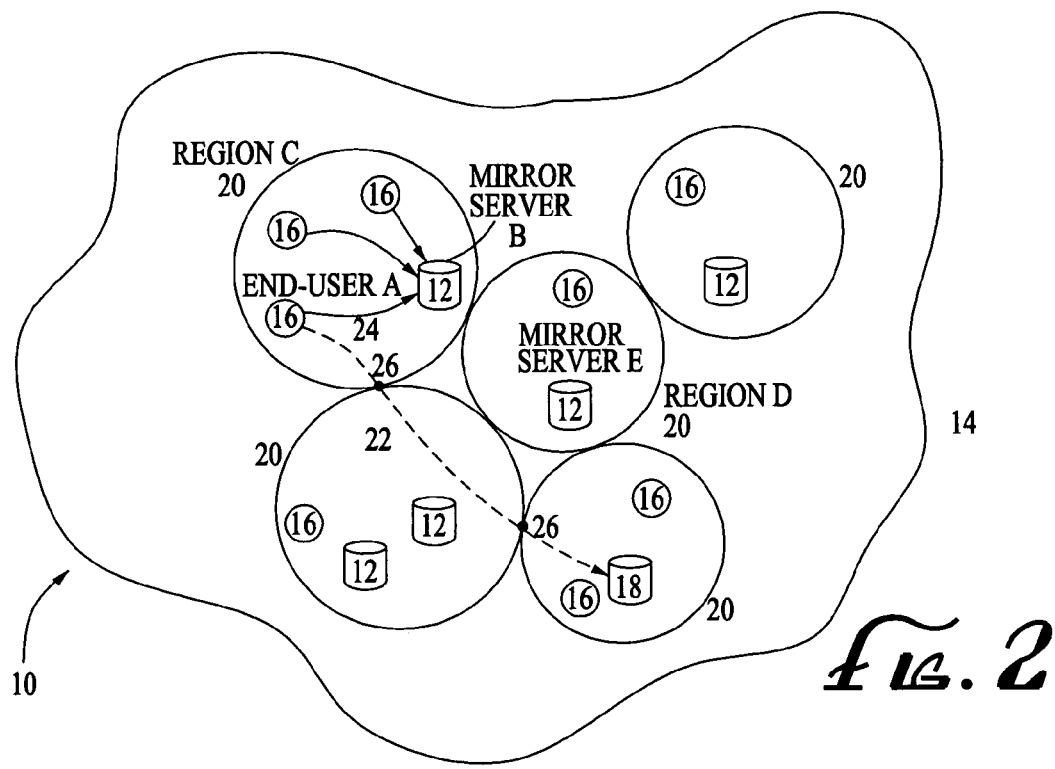
FIG. 2 illustrates a conventional content delivery network in which end-users (client browsers) are redirected to request content from mirror servers located in the same region as the end-users.

In the following description of preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the preferred embodiments of the present invention.

Conventional location-based or load-based approaches to content delivery systems are unduly limited, either by forced adherence to regional boundaries, or a lack of consideration of regional boundaries. In contrast, embodiments of the present invention consider regional boundaries and the network delay associated with crossing regional boundaries, but does not strictly adhere to those boundaries. Rather, embodiments of the present invention may intelligently redirect requesting end users to mirror servers across regional boundaries where doing so would minimize the overall average user response time. Such a system attempts to balance the two elements of user response time, network delay and server delay. In other words, it may be desirable to distribute end-user requests across regional boundaries, if the penalty represented by the additional network delay is less then the gain observed by the reduced load on the system.

System Model

A dynamic content delivery network improves the performance (overall response time) observed by clients (end-user browsers) of its customers (companies or individuals that subscribe the content delivery services). An example of a content delivery system is CachePortal™, described in pending U.S. patent application Ser. No. 09/545,805, entitled "System and Method for Efficient Content Delivery," filed Apr. 7, 2000, the contents of which are incorporated herein by reference. To improve the overall response time of end-user requests, content delivery systems employ mirror servers that are distributed across the Internet. More specifically, the task of any content delivery system is to distribute the load generated by the clients of its customers across the mirror servers that it employs.

However, to efficiently distribute the load, content delivery systems according to preferred embodiments of the present invention take into account the different observable characteristics of each customer $C_i \epsilon C'=\{C_1, \ldots, C_n\}$, which may include, but is not limited to:

their published Web content;
the size of their load requirement (in terms of the requests generated by their clients per second); and
the regional distribution of their load requirement (where are their clients at a given time of the day).

In addition, preferred embodiments take into account different selectable requirements of each customer, which may include, but is not limited to, the performance guarantees that they require (the maximum response time that a client should experience).

It should be understood, however, that these characteristics, as well as the network characteristics, can change during the day as the usage patterns of end-users shift with time of day and the regional location. Therefore, a static solution (such as an optimal content placement strategy) is not sufficient. Instead, embodiments of the present invention dynamically adjust the client-to-server assignment for each customer.

A simplified explanation of the assignment process will now be provided. Referring to the example system of FIG. 3 for purposes of illustration only, a content delivery network 28 includes three geographic regions, a Pacific region 30, a Central region 32, and an Atlantic region 34. Within the Pacific region 30, the total number of requests for a particular customer at a particular point in time is represented by block 36. In addition, this example system includes three mirror servers, a mirror server 38 located in the Pacific region 30, a mirror server 40 located in the Central region 32, and a mirror server 42 located in the Atlantic region 34.

As described earlier, if all of the requests 36 are redirected to mirror server 38, the overall response time may not be minimized due to excessive loads on mirror server 38. Thus, embodiments of the present invention may redirect some of the requests 36 to mirror server 40 or 42. However, there may be different network delays associated with each mirror server. In the present example, if a request 36 is redirected to mirror server 38 (see reference character 44), because both the end-user and the mirror server are in the Pacific region, and there are few network gateways to cross, assume for purposes of discussion that the network delay is negligible. If a request 36 is redirected to mirror server 40 (see reference character 46), because the request must pass through a gateway 26, assume for purposes of discussion that the network delay is one unit. If a request 36 is redirected to mirror server 42 (see reference character 48), because the request must pass through two gateway 26, assume for purposes of discussion that the network delay is two units.

Because a single end-user cannot affect network traffic and network delays substantially, changes to the network delay typically occur gradually over time and are a result of the combined behavior of many end-users. Embodiments of the present invention take advantage of the fact that at any one point in time, network delays are stable, by only periodically recomputing user response times. These computed response times are used to determine an optimal solution (assignment or mapping) over a given time period, until new user response times are recomputed.

As described above, embodiments of the present invention also consider each mirror server's load capacity and server delay. Referring again to FIG. 3, because the network delay between end-users in the Pacific region 30 and mirror server 38 is negligible, it would initially seem to make sense that all requests 36 from the Pacific region should be redirected to mirror server 38. However, as mirror server 36 becomes overloaded with requests, its load capacity may be exceeded, and its server delay may start to increase. To ensure that the overall end-user response time is minimized, embodiments of the present invention recomputes response times, performs a heuristic algorithm (discussed later) to generate an assignment or mapping, and redirects some of the requests to mirror server 40 (see reference character 46) and mirror server 48 (see reference character 48) in accordance with the mapping. In the example of FIG. 3, 50% of the requests are redirected to mirror server 38, 30% of the requests are redirected to mirror server 40, and 20% of the requests are redirected to mirror server 42. The result is an overall minimized user response time.

It should be understood that the solution does take into account geographic or regional information, which manifests itself in the computed response times. Thus, embodiments of the present invention are more flexible than load-based approaches because it does take into account geographic regions, and it is more flexible than location-based approaches because it is possible to redirect end-user requests across regional boundaries to different mirror servers, if such a mapping will reduce overall response times.

A more formal explanation of the assignment process will now be provided. In more precise terms, if a content delivery system has:

m servers, $S'=\{S_1, \ldots, S_m\}$,
n active customers, $C'=\{C_1, \ldots C_n\}$, and
g geographic locations, $G'=\{G_1, \ldots, G_g\}$, then it is a goal of embodiments of the present invention to generate a mapping (i.e. an assignment):

a: $C' \times G' \times S' \rightarrow [0, 1]$, such that, if $$a_{i,j,k} = \frac{\mu}{100},$$

then μ% of the requests to the site of customer $C_i$ that are coming from geographic location $G_j$ are assigned to server $S_k$. For example, if a content delivery server has a total of three servers, $S_1$, $S_2$, and $S_3$, then given a customer $C_1$ in geographic region $G_1$, the mapping may be generated as follows:

$a_{1,1,1} = 0.50$,
$a_{1,1,2} = 0.30$, and
$a_{1,1,3} = 0.20$, which indicates that 50% of the requests for customer $C_1$ in geographic region $G_1$ will be redirected to server $S_1$, 30% of the requests for customer $C_1$ in geographic region $G_1$ will be redirected to server $S_2$, and 20% of the requests for customer $C_1$ in geographic region $G_1$ will be redirected to server $S_3$.

To produce such a mapping, embodiments of the present invention must have knowledge about various aspects of the dynamic-content delivery network including, but not limited to:

the network delay $ndel_{j,k}$ required for the delivery of typical dynamic content (~4 kB size) from server $S_k$ to geographic location $G_j$;

the server delay $sdel_{j,k}$ required for the servicing of a typical dynamic content (~4 kB size) request from server $S_k$ (note that this delay may increase as the load of the server increases, so $sdel_{j,k}$ can be a function of the server load);

the load capacity $s_k$ of server $S_k$ beyond which the server becomes too overloaded to be useful; and the load requirement of customer $C_i$ generated by the end-users located at location $G_j$.

If the entire load requirement of customer $C_i$ is denoted as $c_i$, the portion of this generated by end-users located at $G_j$ is equal to $u_{i,j} \times c_i$. In other words, $u_{i,j}$=the fraction of requests coming to customer $C_i$ from geographic region $G_j$, and thus $u_{i,j} \times c_i$=all requests coming to customer $C_i$ from geographic region $G_j$.

Note that given these aspects of a content delivery system according to embodiments of the present invention, certain constraints exist:

the content delivery system shall not assign more load to the servers than they can handle: In other words, for each $S_k \in S'$, $$\sum_{i=1}^{n} \sum_{j=1}^{g} a_{i,j,k} \times u_{i,j} \times c_i \leq s_k$$

Every end-user request shall be assigned to some server: For each $C_i \in C'$, $G_g \in G'$, $$\sum_{k=1}^{m} a_{i,j,k} = 1.0.$$

An end-user request shall not be assigned to a server which does not have the required content. Therefore, if there are many requests coming to a customer, yet there are no suitable servers for that customer, then embodiments of the present invention may need to migrate corresponding data to a suitable server.

Note also that, by definition, the $a_{i,j,k}$ values of the mapping cannot be negative. That is, for each $C_i \in C'$, $G_g \in G'$, $S_k \in S'$:

$a_{i,j,k} \geq 0$.

Therefore, while choosing an assignment with $n \times g \times m$ variables ($a_{i,j,k}$), embodiments of the present invention must consider $m + n \times g \times m + n \times g$ linear constraints.

According to embodiments of the present invention, the large number of constraints as compared to the number of variables to consider in computing a solution results in multiple solutions that yield the same result. The complication caused by these multiple solutions is that when a particular solution is recomputed, a new solution may be chosen which significantly changes all the previous mappings. New mappings, while not catastrophic, may lead to increased delays as new connections must be made across geographic boundaries, and the system performance may not be stable. Thus, in alternative embodiments, another constraint on the solution is that, given more than one possible optimum solution, a solution shall be selected that minimizes the differences between the previous mapping and the new mapping.

Under certain conditions, the various constraints that must be considered in order to generate a solution can be specified as linear constraints, which are constraints that can be specified by variables that may only be multiplied by constants, not multiplied by each other or raised to a power. Because the constraints can be specified as linear constraints, in alternative embodiments of the present invention, a linear constraint solver may be used, a complex computation well-understood by those skilled in the art. However, solving linear constraints requires a lot of time.

In further alternative embodiments of the present invention, the various constraints may be specified in terms of nonlinear constraints, and a nonlinear constraint solver can be used to produce a solution. However, solving nonlinear constraints is generally much more inefficient than solving linear constraints, and therefore is generally slower. As will be described later, when a heuristic algorithm is used according to preferred embodiments of the present invention, the constraints may be specified as nonlinear constraints, and yet a solution can be generated in a shorter amount of time.

Performance Tuning for Dynamic-Content Delivery Networks

Response Time

As discussed above, each mirror server has an associated expected server delay time, which is usually a function of its load. FIG. 4 illustrates a graph of an example mirror server delay time characteristic. The mirror server $S_i$ provides a relatively constant response time up to some load $s_i$, beyond which the server delay time jumps suddenly (see reference character 50). Therefore, as long as the load of the mirror server is kept below $s_i$, the server delay can be estimated as a constant or specified as a linear constraint, either the typical delay of the server ($sdel_1$) or its worst case delay time ($sdel_2$).

In preferred embodiments of the present invention, to increase the accuracy of the estimated server delay, the server load constraint previously described may be adjusted to, for example, 80% of the maximum server load capacity in order to remain below this $s_k$ threshold and remain in the linear region. However, once a solution is computed with that constraint and that solution is in place for the next period of time, it is possible for the actual server load to fluctuate above or below $s_k$.

The average prioritized observed response time (AORT) of the dynamic-content delivery network can be defined as follows:

$$AORT = \frac{\sum_{i=1}^{n}\sum_{j=1}^{g}\sum_{k=1}^{m} a_{i,j,k} \times u_{i,j} \times c_i \times p_i \times (sdel_k + ndel_{j,k})}{\sum_{i=1}^{n} c_i \times p_i},$$

where $sdel_k$ is the server delay, $ndel_{j,k}$ is the network delay observed by customers in geographic location $G_j$ while accessing server $S_k$, and $p_j$ is the priority of the customer (based on its service agreements). For purposes of simplifying the discussion, the examples presented herein will assume that all customers have the same priority; i.e., for all $C_i \in C'$, $p_i = 1$. However, it should be noted that embodiments of the present invention can take into account differing priority values $p_i$.

In addition to AORT, individual observed response times ($AORT_i$s) can be defined for the clients (end-users) of individual customers:

$$AORT_i = \frac{\sum_{j=1}^{g}\sum_{k=1}^{m} a_{i,j,k} \times u_{i,j} \times c_i \times (sdel_k + ndel_{j,k})}{c_i}.$$

Note that these definitions of response time are linear. Thus, they can be minimized/solved using a linear optimization technique, such as simplex. However, if the server delay cannot be treated as a constant, then the definition is not linear and a non-linear optimization technique (which is generally much more expensive) will need to be utilized.

For purposes of understanding the equation, the components of $AORT_i$ will now be described. As noted above, $sdel_k$ is the server delay of server K, and $ndel_{j,k}$ is the network delay between geographic location J and server K. Thus, $sdel_k + ndel_{j,k}$ represents the total delay seen by requests coming from geographic region J to server K. Furthermore, $c_i$ is the total load of customer I, and $u_{i,j}$ is the fraction of requests coming to customer I from region J. Thus, $u_{i,j} \times c_i$ equals the number of requests coming to customer I from region J. In addition, $a_{i,j,k}$ represents the fraction of requests coming to customer I from region J that have been redirected to server K. Thus, $a_{i,j,k} \times u_{i,j} \times c_i$ equals all requests coming to customer I from region J that have been assigned to server K. When this result is multiplied by $sdel_k + ndel_{j,k}$, the result is the total delay of all requests coming to customer I from region J that have been assigned to server K. This delay is then summed up over all servers and all geographic locations. Thus, the numerator of $AORT_i$ represents the total delay for all requests coming to customer I from all regions that have been assigned to all servers. When the numerator of $AORT_i$ is divided by $c_i$, which is the total number of requests to customer i, the average response time for all of those requests can be computed.

In alternative embodiments of the present invention, response times can be minimized by minimizing both AORT and $AORT_i$ using a linear constraint solver. However, the time it takes to produce a solution using a linear constraint solver may be prohibitive. For example, in embodiments of the present invention, the system may recompute a new solution after a certain period of time, such as, for example, every 30 seconds. Once a present solution is computed, requests occurring within the next 30 second period would then follow the previously computed solution. However, it may take up to one hour or more to compute a solution using a linear constraint solver. Again, it should be understood that solutions are not computed based on individual requests. Instead, the overall response time of end-user requests is monitored, and if the overall response time begins to rise, the system may compute a new solution which redirects some of those requests to another location.

Server Load Balancing

In addition to the linear constraints previously described, which produce the lowest overall response times, in preferred embodiments of the present invention additional linear constraints may be imposed to balance the load of the mirror servers. While load balancing is not necessarily required to produce the lowest overall response times, it can be a factor in certain situations. For example, referring again to FIG. 4, a solution for minimizing response times may result in all mirror servers having a server load of less than $S_k$, but without load balancing the server load for individual mirror servers may not be balanced. In other words, one mirror server may have a server load that is very close to $S_k$, while another mirror server may have a server load far away from $S_k$. This can lead to problems, because a mirror server that has a server load close to $S_k$ may encounter load fluctuations that push its server load above $S_k$, resulting in excessive response times. By adding a load balancing constraint to the problem to be solved, all of the mirror server loads will be as far away from $S_k$ as possible, and load fluctuations will be less likely to produce excessive response times.

A more formal description of the load balancing requirement will now be provided. Given $\Theta$, which describes the maximum allowed deviation from balanced mirror servers, then for all pairs of servers, $S_k$ and $S_l$, the following constraint must be satisfied:

$$\frac{\sum_{i=1}^{n}\sum_{j=1}^{g} a_{i,j,k} \times u_{i,j} \times c_i}{\sum_{i=1}^{n}\sum_{j=1}^{g} a_{i,j,l} \times u_{i,j} \times c_i} \leq (1+\Theta) \times \frac{s_k}{s_l}.$$

The appropriate value of $\Theta$ can either be application-dependent or can be searched using a binary search until a feasible set of equations are discovered. Note that this adds $m \times (m-1)$ more inequalities to the system.

For purposes of understanding the above equation, its components will now be described. It should be understood that the equation represents the load balance between two mirror servers K and L. Once again, $c_i$ is the total load of customer I, $u_{i,j}$ is the percent of requests coming to customer I from region J, and $a_{i,j,k}$ represents the fraction of requests coming to customer I from region J that have been redirected to server K. Thus, $a_{i,j,k} \times u_{i,j} \times c_i$ equals all requests coming to customer I from region J that have been assigned to server K. In the numerator, this value is summed for all regions and all customers to generate a total load for mirror server K. The same thing is done in the denominator to come up with a total load for mirror server L. The left side of the equation is therefore a ratio of the loads of mirror server K and mirror server L. That ratio must be less than a certain threshold represented on the right side of the equation by $(1+\Theta)$, where the character $\Theta$ is a fractional value representing how much of an imbalance will be tolerated.

In addition, it should be noted that the right side of the equation also includes a ratio $s_k/s_l$, where $s_k$ represents the load capacity of server K and $s_l$ represents the load capacity of server L. The reason for having this ratio in the equation is that not all mirror servers have the same load capabilities, and it does not make sense to balance the load of two mirror servers when their load capabilities differ. Thus, for example, if server K has much greater server load capability than server L, a balanced pair of mirror servers would have each mirror server operating at, say, 60% of maximum even though mirror server K may be processing many more end-user requests than server L.

Alternatively, if the previously described response time constraints are too expensive to compute or the network delays are insignificant, the load imbalance may be explicitly minimized. In that case, instead of minimizing the AORT function, we would minimize an imbalance function (IMBL) as described below:

$$IMBL = \sum_{k=1}^{m} \sum_{l=k+1}^{m} |\text{load}(S_k) - \text{load}(S_l)|,$$

where $$\text{load}(S_k) = \sum_{i=1}^{n} \sum_{j=1}^{g} a_{i,j,k} \times u_{i,j} \times c_i$$

is the load of the server, $S_k$.

Maintaining Stability of the Dynamic-Content Delivery Network

As discussed earlier, the system parameters (such as the customer load requirements) that affect a content delivery system can change often, and thus such systems must adapt to changes quickly. In addition, when a new solution is computed, preferred embodiments of the present invention compute a solution that is as close to possible as the previous solution. Furthermore, the adaptation should cause minimal (or no) disruption to service provided to existing customers. For instance:

an increase in the resources due to the addition of a new server or the service termination of a customer should not cause a load redistribution, unless it violates the load-balance constraint $\Theta$, a new customer should be accepted into the system only if the average observed response time for the existing customers does not increase too much. That is, given the old and new values of the AORT function, $$AORT_{old} = \frac{\sum_{i=1}^{n} \sum_{j=1}^{g} \sum_{k=1}^{m} a_{i,j,k} \times u_{i,j} \times c_i \times (sdel_k + ndel_{j,k})}{\sum_{i=1}^{n} c_i}, \text{ and}$$

$$AORT_{new} = \frac{\sum_{i=1}^{n} \sum_{j=1}^{g} \sum_{k=1}^{m} a'_{i,j,k} \times u_{i,j} \times c_i \times (sdel_k + ndel_{j,k})}{\sum_{i=1}^{n} c_i},$$

the system should ensure that $$AORT_{new} \leq (1+\Phi) \times AORT_{old},$$

where $a'_{i,j,k}$ is the new assignment and $\Phi$ is the allowable change in the average response time for the existing clients. Note that although this guarantees that, on the average, customers will not observe a big change in response time, it does bound the change observed by individual customers. Hence, customer-specific response time change constraints may also be used as well:

$$AORT_{i,new} \leq (1+\Phi_i) \times AORT_{i,old}$$

where $\Phi_i$ is the allowable fractional change in the average response time of the customer $C_i$. Note that $\Phi_i$ is a value that is initially selected, such as 0.05 (5%). However, if there is no solution that can satisfy the 5% change constraint, preferred embodiments of the present invention will automatically increase the value of $\Phi_i$ by a certain amount until a solution is found.

changes in the request rates (or loads) of existing customers should not affect the average observed response time for existing customers. This constraint can be defined similar to the constraints of the previous item.

Techniques for Calculating the Assignment Mapping

As discussed earlier, the above constraints can generally be described in the form of linear constraints. Hence, in alternative embodiments of the present invention a general purpose linear optimization tool, such as Maple software (which includes simplex), can be used to solve the constraints optimally. If the mirror server delay is not constant, however, as illustrated in FIG. 4, then the constraints will be non-linear, and a non-linear constraint optimization technique will have to be used. However, because the number of variables and constraints grows rapidly as the size of the problem increases, both of these options can be very expensive. In addition, these options do not scale up well.

Thus, in preferred embodiments of the present invention an efficient heuristic algorithm is implemented that produces close-to-optimal results with a short execution time. In preferred embodiments, the heuristic approach is capable of solving the previously described constraints AORT and $AORT_i$, and the previously described load balancing constraints and the increase in response time constraints.

Intuition

The intuition behind the heuristic algorithm according to preferred embodiments of the present invention will now be described. Considering again the average response time AORT, $$\frac{\sum_{i=1}^{n} \sum_{j=1}^{g} \sum_{k=1}^{m} a_{i,j,k} \times u_{i,j} \times c_i \times (sdel_k + ndel_{j,k})}{\sum_{i=1}^{n} c_i},$$

it can be seen that one way to prevent AORT from growing too fast is to limit the summation values in the numerator by assigning large $a_{i,j,k}$ values to small $u_{i,j} \times c_i \times (sdel_k + ndel_{j,k})$ values. Such an assignment will cause the individual terms in the summation, and thus the overall AORT, to be small in general. For example, assume for purposes of illustration only that there is an i,j,k triple 2,2,3 and that the $u_{i,j} \times c_i \times (sdel_k + ndel_{j,k})$ value for the i,j,k triple 2,2,3 produces a value of 50. Also assume that there is another i,j,k triple 2,1,4 that produces a $u_{i,j} \times c_i \times (sdel_k + ndel_{j,k})$ value of 24. In addition, assume that a value of 0.2 or 0.4 can be assigned to $a_{i,j,k}$. By assigning the larger $a_{i,j,k}$ value (0.4) to the smaller $u_{i,j} \times c_i \times (sdel_k + ndel_{j,k})$ value (24), a smaller overall response time will be produced.

Iterative Merge-Based Technique

The heuristic algorithm according to embodiments of the present invention is iterative. At each iteration, at least four sorted lists are created:

$C_i$ values are sorted in increasing order of $c_i$ (i.e., customers are sorted in order of increasing server load), $<C_i, G_j>$ pairs are sorted in increasing order of $u_{i,j}$ (i.e. customer and region pairs are sorted in order of increasing fractional amounts of requests coming to the customer i from region j), $S_k$ values are sorted in increasing order of $sdel_k$ (i.e. servers are sorted in order of increasing server delay), and $<G_j, S_k>$ pairs are sorted in increasing order of $ndel_{j,k}$ (i.e. server and region pairs are sorted in order of increasing network delay). Note that if $ndel_{j,k}$ is not constant but rather a function of the mirror server load, this term needs to be adjusted at each iteration. Thus, the heuristic algorithm according to preferred embodiments extends to non-linear cases of the problem as well.

In addition, in preferred embodiments, in order to promote load balancing, $C_i$ values are also sorted in decreasing order of remaining load capacity $s_k$ (i.e. servers are sorted in decreasing order of remaining load capacity).

Note that all of these sorted values were measured at a certain point in time, prior to the recomputation of the present solution.

Once the sorted lists are generated, the heuristic algorithm according to embodiments of the present invention performs a sequence of iterative steps. At each iteration, the top-most $<C_i, G_j, S_k>$ triple with the smallest $u_{i,j} \times c_i \times (sdel_k + ndel_{j,k})$ value is selected through a merging operation. The server $S_k$ of the selected $<C_i, G_j, S_k>$ triple is then assigned the remaining load from the $<C_i, G_j>$ pair. If the load capacity of the server $S_k$ is not sufficient to handle the remaining load, then the remaining capacity of the server $S_k$ is used for the $<C_i, G_j>$ pair, and the unassigned portion of the pair is reinserted to the iterative process.

Figure 5:
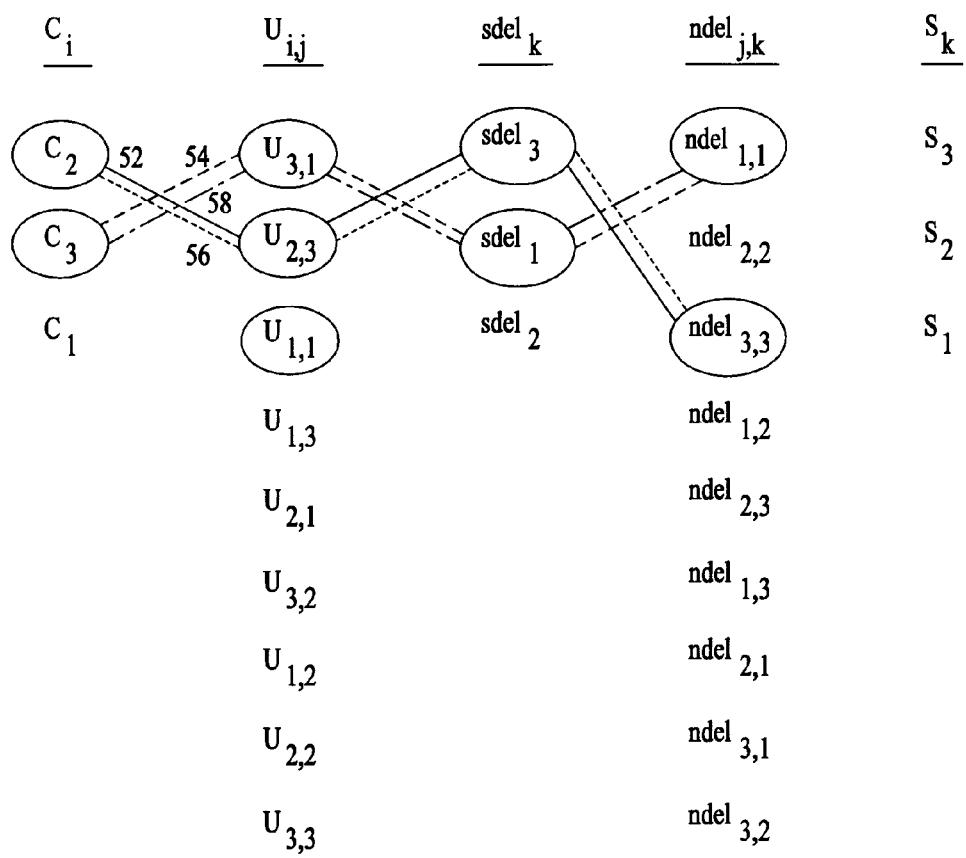
FIG. 5 illustrates an example of the heuristic algorithm for assigning end-users to mirror servers according to an embodiment of the present invention.

An example environment including three customers, three regions, and three servers will now be presented for purposes of explaining this iterative merge operation. Assume that this example environment results in the sorted lists $c_i$, $u_{i,j}$, $sdel_k$, $ndel_{j,k}$, and $s_k$ as illustrated in FIG. 5. First, as discussed above, the smallest $u_{i,j} \times c_i \times (sdel_k + ndel_{j,k})$ value is selected by taking the top item in each of the leftmost four lists, and finding the smallest comparable item in each of the remaining leftmost four lists.

Thus, the top item in the first list may be selected, which happens to be $c_2$ in this example. The selection of $c_2$ means that comparable items in each of the remaining lists $u_{i,j}$, $sdel_k$, and $ndel_{j,k}$, must have i=2. In preferred embodiments of the present invention, when the top item in the $c_i$ list is selected first, the process of finding comparable items moves from list to list in the order $c_i \rightarrow u_{i,j} \rightarrow ndel_{j,k} \rightarrow sdel_k$. Therefore, in list $u_{i,j}$, the comparable item is the highest $u_{i,j}$ pair with i=2, or $u_{2,3}$. The selection of $u_{2,3}$ adds an additional restriction in that comparable items in each of the remaining lists $sdel_k$ and $ndel_{j,k}$ must have i=2 and j=3. In list $ndel_{j,k}$ the comparable item is the highest $ndel_{j,k}$ pair with j=3, or $ndel_{3,3}$. The selection of $ndel_{3,3}$ adds an additional restriction in that the comparable item in the remaining list $sdel_k$ must have k=3, or $sdel_3$. From these four comparable items $c_2$, $u_{2,3}$, $ndel_{3,3}$, and $sdel_3$ (see reference character 52) a value for $u_{i,j} \times c_i \times (sdel_k + ndel_{j,k})$ using the triple <2,3,3> can be computed.

This same process is repeated for the top item in the second list ($u_{3,1}$). In preferred embodiments of the present invention, when the top item in the $u_{i,j}$ list is selected first, the process of finding comparable items moves from list to list in the order $u_{i,j} \rightarrow ndel_{j,k} \rightarrow sdel_k \rightarrow c_i$, resulting in comparable items $c_3$, $u_{3,1}$, $ndel_{1,1}$, and $sdel_1$, (see reference character 54). From these comparable items a value for $u_{i,j} \times c_i \times (sdel_k + ndel_{j,k})$ using the triple <3,1,1> can be computed. It should be noted that in alternative embodiments, the process of finding comparable items may move from list to list in the order $u_{i,j} \rightarrow ndel_{j,k} \rightarrow c_i \rightarrow sdel_k$, or in the order $u_{i,j} \rightarrow c_i \rightarrow ndel_{j,k} \rightarrow sdel_k$.

This same process is then repeated for the top item in the third list ($ndel_{1,1}$). In preferred embodiments of the present invention, when the top item in the $ndel_{j,k}$ list is selected first, the process of finding comparable items moves from list to list in the order $ndel_{j,k} \rightarrow sdel_k \rightarrow u_{i,j} \rightarrow c_i$, resulting in comparable items $c_3$, $u_{3,1}$, $ndel_{1,1}$, and $sdel_1$ (see reference character 58). Note that the comparable items happen to be the same as the second group of comparable items. From these comparable items a value for $u_{i,j} \times c_i \times (sdel_k + ndel_{j,k})$ using the triple <3,1,1> can be computed. It should be noted that in alternative embodiments, the process of finding comparable items may move from list to list in the order $ndel_{j,k} \rightarrow u_{i,j} \rightarrow sdel_k \rightarrow c_i$, or $ndel_{j,k} \rightarrow u_{i,j} \rightarrow c_i \rightarrow sdel_k$.

Finally, this same process is repeated for the top item in the fourth list ($sdel_3$). In preferred embodiments of the present invention, when the top item in the $sdel_k$ list is selected first, the process of finding comparable items moves from list to list in the order $sdel_k \rightarrow ndel_{j,k} \rightarrow u_{i,j} \rightarrow c_i$, resulting in comparable items $c_2$, $u_{2,3}$, $ndel_{3,3}$, and $sdel_3$, (see reference character 56). Note that the comparable items happen to be the same as the first group of comparable items. From these comparable items a value for $u_{i,j} \times c_i \times (sdel_k + ndel_{j,k})$ using the triple <2,3,3> can be computed.

Next, the triple having the smallest merged delay value is identified. Continuing the above example, if the $u_{i,j} \times c_i \times (sdel_k + ndel_{j,k})$ merged delay values for the triples <2,3,3> and <3,1,1> are 10 units and 5 units, respectively, then the triple <3,1,1> is selected. As a result, server $S_1$ is assigned the load coming to customer $C_3$ from region $G_1$, and a particular $a_{i,j,k}$ value is assigned to the triple <3,1,1>. The result of assigning an $a_{i,j,k}$ value to a particular merged delay value is that an assignment of a particular customer to a particular server in a particular region has been made.

If server $S_1$ has sufficient load capacity $s_1$ to handle all of the assigned load, then the $a_{i,j,k}$ value is maximized (=1.0) and $AORT_i$ is minimized, and the goal of assigning large $a_{i,j,k}$ values to small $u_{i,j} \times c_i \times (sdel_k + ndel_{j,k})$ values is satisfied. The $c_i$ and $u_{i,j}$ values are then recomputed taking into account this assignment. For example, because all of the load coming to customer $C_3$ from region $G_1$ has now been accounted for, the value of $u_{3,1}$ is now zero, and thus $u_{3,1}$ is removed from the $u_{i,j}$ list. Furthermore, because some of the load for customer $C_3$ has now been accounted for, the value of $c_3$ is reduced. It should be noted that despite the initial assignment, $sdel_k$ and $ndel_{j,k}$ do not change, because they are assumed to be constant.

If server $S_1$ does not have sufficient load capacity $s_1$ to handle all of the assigned load, then the $a_{i,j,k}$ value is computed as a value between zero and one, and a particular $AORT_i$ value is computed. The remaining capacity of the server $S_1$ is then assigned to handle some of the load coming to customer $C_3$ from region $G_1$. As a result, the value of $s_1$ is now zero, and thus $s_1$ is removed from the $s_k$ list. Furthermore, because some of the load coming to customer $C_3$ from region $G_1$ has now been accounted for, the value of $u_{3,1}$ and $c_3$ is reduced.

Once these assignments have been made and the values for $c_i$, $u_{i,j}$, and $s_k$ are recomputed, the lists for $c_i$, $u_{i,j}$, and $s_k$ are re-sorted. The process of finding comparable items for the top item in each list is repeated, the $<C_i,G_j,S_k>$ triple with the smallest value is identified, server loads are assigned, and $a_{i,j,k}$ and $AORT_i$ values are computed. This iterative process is repeated until all loads coming to all customers $C_i$ from all regions $G_j$ have been assigned to a server $S_k$, where possible.

It should be noted that the example previously discussed did not take into account the $s_k$ list. However, in preferred embodiments of the present invention, load balancing can be taken into account by including the sorted $s_k$ list in the process of finding comparable items in the lists. In preferred embodiments, the process of finding comparable items by proceeding through any of the list-to-list orders discussed above will include the list $s_k$ at the end of the order.

Data Migration

The previous discussion assumed that all mirror servers contained a copy of the content requested by end-users. Suppose, however, that an assignment is made where end-users are assigned to fetch content from a particular mirror server that does not have the requested content. Generally, that assignment should not have been made. However, if the assignment would overall result in lower overall response times, the assignment may nevertheless be worthwhile, if the requested content can be copied to that mirror server. The copying or migration of data represents a penalty, and thus assignments that require data migration should be made only where necessary. To minimize the number of assignments to servers without the requested data, in preferred embodiments of the present invention another list can be created, comprising:

$<C_i,S_k>$ pairs, unsorted (i.e., customer and server mappings in which the content of customer i is stored in server k).

The list of $<C_i,S_k>$ pairs is unsorted, and merely represents all $<C_i,S_k>$ pairs in which the content of customer i is stored in server k. Once a $<C_i,G_j,S_k>$ triple representing minimal merged delay is identified as described above, this list is consulted to ensure that the assigned triple does not result in customer loads being assigned to mirror servers that do not contain the requested content.

If the iterative process fails to find a solution (that is, if no suitable server can be found), a suitable candidate ($<C_i,G_j,S_k>$ triple) with the smallest $u_{i,j} \times c_i \times (sdel_k + ndel_{j,k})$ is chosen and the data of customer $C_i$ is migrated to server $S_k$. In preferred embodiments, the time penalty associated with migrating data to a server $S_k$ may be quantified. Thus, when choosing a suitable candidate ($<C_i,G_j,S_k>$ triple) with the smallest $u_{i,j} \times c_i \times (sdel_k + ndel_{j,k})$, the server $S_k$ having the smallest penalty may be selected.

Response Time Estimation

As the preceding equations illustrate, the heuristic algorithms according to embodiments of the present invention require that the server delay $sdel_k$ and network delay $ndel_{j,k}$ observed by end-users accessing a particular mirror server and located at a given geographic location be quantified. Server delay, which is the time it takes for a mirror server to process an end-user request, can be directly determined from the mirror server itself. Because the mirror servers are part of the content delivery system, measuring server delay is relatively straightforward.

Network delay is more difficult to measure. Because content delivery systems do not have access to machines in every location of importance, end-user response times generally cannot be directly measured. However, network delay can be estimated using server logs that are maintained by the mirror servers. It should be understood that when a remote end-user requests content from a particular mirror server, a sequence of messages are passed back and forth between the user and the server, and the timing of these messages are stored in server logs. The timing of these messages is used to estimate the overall response time.

Available Logs

There are two types of server logs available from a mirror server. One type is called TCP logs and the other is called HTTP logs. Each type of log yields a different set of information.

Using TCP Logs

TCP logs can be used to estimate the characteristics of the connection between the mirror server and the client/proxy/end-user that is immediately upstream over the connection, including the immediate round trip delay. For purposes of illustration only, assume that a system includes a mirror server and an end-user, and that the end-user's Web browser has opened up a connection with the mirror server. Because TCP logs store two variables, including the connection establishment time, the immediate round-trip delay and the per-byte delay can be extracted from the TCP logs.

In embodiments of the present invention, the immediate round-trip delay can be defined as $$t_{con\_est} - t_{ack\_send} = \Delta r_{imm},$$

where (1) $t_{con\_est}$ is the time at which the mirror server receives a connection establishment message (the time at which a connection is established), (2) $t_{ack\_send}$ is the time at which the mirror server sends an acknowledgement message in reply to a connection request message received from a client, and (3) $\Delta r_{imm}$ is the round trip delay between the server and the entity that is immediately upstream. Because both $t_{con\_est}$ and $t_{ack\_send}$ are stored in the TCP logs, $\Delta r_{imm}$ can be readily computed.

Furthermore, in embodiments of the present invention the equation $$t_{ack\_receive}(k) - t_{data\_send}(l) = \Delta r_{imm} + \alpha \times (k-l)$$

can be used to estimate the connection parameters $\Delta r_{imm}$ and a constant a describing per-byte delay, which is the delay associated with each byte in a particular message. Here, $t_{data\_end}(l)$ is the time at which $l^{th}$ byte of data has been sent, and $t_{ack\_receive}(k)$ is the time at which acknowledgement for the $k^{th}$ ($k \geq 1$) byte is received.

Because TCP logs store the time at which the $l^{th}$ byte of data has been sent and the time at which acknowledgment for the $k^{th}$ has been received, these stored values can be plugged into the above equation, along with $\Delta r_{imm}$, in order to determine the per byte delay $\alpha$. Note that due to the TCP flow control mechanism, in general, the $\alpha$ value is not fixed during the communication. Similarly, $\Delta r_{imm}$ may change during the lifetime of the connection. However, because there are many acknowledgements sent during the course of a single connection, it is possible to gather statistically significant values, which describe the general behavior of the connection over time.

Continuing the present example for purposes of illustration only, assume, as illustrated in FIG. 6, that the TCP logs indicate that the 100$^{th}$ byte of data was sent at time 5, the 200$^{th}$ byte was sent at time 7, the 300$^{th}$ byte of data was sent at time 8, and the 400$^{th}$ byte of data was sent at time 9. In addition, assume that the TCP logs indicate that an acknowledgment for 100$^{th}$ byte was received at time 10, the acknowledgment for the 200$^{th}$ byte was received at time 15, the acknowledgment for the 300$^{th}$ byte was received at time 30, and the acknowledgment for the 400$^{th}$ byte was received at time 31.

By looking at any two pairs of l and k, an estimated per-byte delay can be determined. Continuing the present example, if two entries are used from the TCP logs, one entry being the fact that the 100$^{th}$ byte of data was sent at time 5 (see reference character 60) and the other entry being the fact that acknowledgment for the 200$^{th}$ byte was received at time 15 (see reference character 62), a per-byte delay can be computed. Note, however, that the data send time and the acknowledgment received time for the same 100 bytes of data (l=k) cannot be compared, because such a comparison would only yield information on the network delay. To determine how the size of the message impacts the delay, two different byte transmissions must be compared.

In the present example, l=100, k=200, (k-l)=100, $t_{ack\_receive}(k)=15$, and $t_{data\_send}(l)=5$. Because $\Delta r_{imm}$ is known, the value for $\alpha$ can be determined from the previously defined equation $t_{ack\_receive}(k)-t_{data\_send}(l)=\Delta r_{imm}+\alpha\times(k-l)$. Different values for $\alpha$ can also be computed for various pairs of l and k. In preferred embodiments, the $\alpha$ values can be averaged, or the last computed a value could be selected as the per-byte delay.

FIG. 7 illustrates a graphical representation of the previously described example computation according to embodiments of the present invention. As represented by $t_{ack\_receive}(k)-t_{data\_send}(l)$ (see reference character 64), the comparison of the elapsed time between sending the l$^{th}$ byte of data and receiving acknowledgment of the k$^{th}$ byte of data includes roundtrip delay information $\Delta r_{imm}$ plus (k-l) units of byte delay. The time labeled by reference character 66 is equivalent to $\alpha\times(k-l)$, while $\Delta r_{imm}$ is represented in two time periods identified by reference characters 68 and 70.

It should be understood that the response time estimation methods described above, as well as those described below, are not necessarily restricted for use in determining optimal server load distributions for minimizing overall response times. In alternative embodiments of the present invention, the methods for estimating response times described herein may be user for other purposes such as, but not limited to, quantifying network performance.

Using HTTP Logs

As indicated above, in embodiments of the present invention response times can also be estimated using HTTP logs. There are three types of HTTP connections: non-persistent connections, persistent connections, and persistent connections with pipelining. When non-persistent connections are used, each time an object is requested a connection is opened, the request is transmitted, the information is received, and then the connection is closed. The connection does not persist. Thus, each time an object is transferred, a new connection must be opened. For persistent connections, a connection is opened, requests for multiple objects are transmitted, the requested information is received, and finally the connection is closed. The connection is not closed until all of the objects have been received. For persistent connections with pipelining, a connection is opened, requests for an object are transmitted, but before that object is received, further requests for objects are being transmitted. Thus, the requests are pipelined within the same connection.

Non-Persistent Connections

The mirror server logs for non-persistent connections may contain the following information:

| | |
|---|---|
| $t_{con\_req\_rec}$ | connection request time (TCP) |
| $t_{con\_est\_send}$ | time at which connection establishment message is sent (TCP) |
| $t_{con\_est\_rec}$ | time at which connection establishment message is received (TCP) |
| $t_{req\_rec}$ | request retrieval time |
| $t_{resp\_send\_beg}$ | time at which the server starts sending the response |
| $t_{resp\_send\_end}$ | time at which the server stops sending the response |

It should be understood that because there may be a proxy server between the client (end-user) and the mirror server, the equation $$t_{con\_est\_rec}-t_{con\_est\_send}$$

cannot be used to estimate the server-client round trip delay. If a proxy server exists between the end-user and the mirror server, the end-user makes a request to the proxy server, and then the proxy server makes a request to the mirror server. Once the requested information has been retrieved by the mirror server, the mirror server sends that information back to the proxy server, and then the proxy server sends the information back to the end-user. It is therefore not possible to estimate the round trip delay from the log of a single non-persistent connection because $t_{req\_rec}-t_{con\_est\_send}$ is almost zero and independent of the transmission delay, and because the connection does not have an explicit connection close message.

However, in embodiments of the present invention the time between two non-persistent connections can be used to estimate the round trip delay. Assuming that an end-user's Web browser requests two consecutive objects, $o_i$ and $o_{i+1}$, in a single page without a delay between them, then $$t_{con\_req\_rec}(i+1)-t_{resp\_send\_end}(i)=\Delta r_{server,client}.$$

This equation represents the time between when a mirror server sends the object for the ith request back, $t_{resp\_send\_end}(i)$, and when the mirror server receives a connection request for the next (i+1)$^{th}$ object. This essentially is the time from the end of a first request to the time of the beginning of a second request.

It should be noted that even if there may be a proxy server between the end-user and the mirror server, as long as the client is using non-persistent connections, the above equation will be a good estimate of the round trip delay. Furthermore, even if the client is using a (non-pipelined) persistent connection, but a proxy server is splitting the connection into multiple non-persistent connections, the average $\Delta r_{server,client}$ will give a reasonable estimate of the round trip delay between the client and the server. However, if the client (or the intermediate proxy server) is using simultaneous non-persistent connections, $\Delta r_{server,client}$ cannot be estimated using the delay between two consecutive connections.

Persistent Connections

The server logs for persistent, non-pipelined, connections may contain the following information:

| | |
|---|---|
| $t_{con\_req\_rec}$ | connection request time(TCP) |
| $t_{con\_est\_send}$ | time at which connection establishment message is sent(TCP) |
| $t_{con\_est\_rec}$ | time at which connection establishment message is received(TCP) |
| $t_{req\_rec}(j)$ | $j^{th}$ request retrieval time |
| $t_{resp\_send\_beg}(j)$ | time at which the server starts sending the response for $j^{th}$ request |
| $t_{resp\_send\_end}(j)$ | time at which the server stops sending the response for $j^{th}$ request |
| $t_{con\_close\_rec}$ | time at which the server receives a request to close the connection |

In embodiments of the present invention, the following equation can be used to estimate the round trip delay between the client and the server:

$$t_{con\_close\_end} - t_{resp\_send\_end}(\text{last}) = \Delta r_{server,client},$$

or more generally, the following equation can be used:

$$t_{req\_rec}(j+1) - t_{resp\_send\_end}(j) = \Delta r_{server,client},$$

Estimation of round trip delay for persistent connections is very similar to the estimations of round trip delay for non-persistent connections, but are generally more accurate. For non-persistent connections, an assumption was necessary that the same client browser requested two consecutive objects in a single page without delays between them. With persistent connections, it is known that all of the requests within that particular connection are from the same client browser for consecutive objects in a single page and that there are no other delays between them.

Persistent Connections with Pipelining

The server logs for persistent pipelined connections are similar to the logs of non-pipelined persistent connections. Therefore, in embodiments of the present invention, the round trip delay between the client and the server can still be estimated as $$t_{con\_rec} - t_{resp\_send\_end}(\text{last}) = \Delta r_{server,client}.$$

With persistent pipelined connections, the requests are generally overlapped and the only time information available is the last request, $t_{resp\_send\_end}(\text{last})$. Using the last request, the calculation is then performed in a manner similar to persistent connections, described above. It should be noted that not all Web browsers send connection close messages, and therefore the above equation may not always be available to estimate round trip delay time when persistent pipelined connections are used. It should further be noted that even though the last request is used in persistent pipelined connections, all that is required is a single sample of the round trip delay time. Thus, even though only one data point is available in this situation, it is sufficient.

Estimating the Response Time Observed by the Client During a Single HTTP Connection The preceding sections described the computation of an estimated round trip delay time according to embodiments of the present invention. However, to use the heuristic algorithm previously described, the overall response time observed by the client must be estimated. This overall response time includes the round trip delay time and the server delay required for a mirror server to process a request. Using the information collected from the HTTP logs, the response time observed by the client software can be estimated using different techniques, depending on the nature of the connection.

For non-persistent connections, in embodiments of the present invention the response time of the server can be estimated as $$(t_{resp\_send\_end} - t_{con\_req\_rec}) + 2 \times \frac{\Delta r_{server,client}}{2}.$$

The first term above represents the time that server has been involved in the process (server delay). The latter term represents the round trip delay, the two network delays observed by the client (before the server receives the connection request, and after the server sends the last byte).

For persistent connections without pipelining, in embodiments of the present invention the response time of the server can be estimated as $$(t_{con\_close\_rec} - t_{con\_req\_rec}) + \frac{\Delta r_{server,client}}{2} - \frac{\Delta r_{server,client}}{2} = t_{con\_close\_rec} - t_{con\_req\_rec}.$$

The first term above (in parentheses) gives the time that server has been involved in the process (server delay). Note that in order to find the response time observed by the end-user, the network delay during the connection establishment must be added, and the network delay during the connection close must be subtracted.

Figure 8:
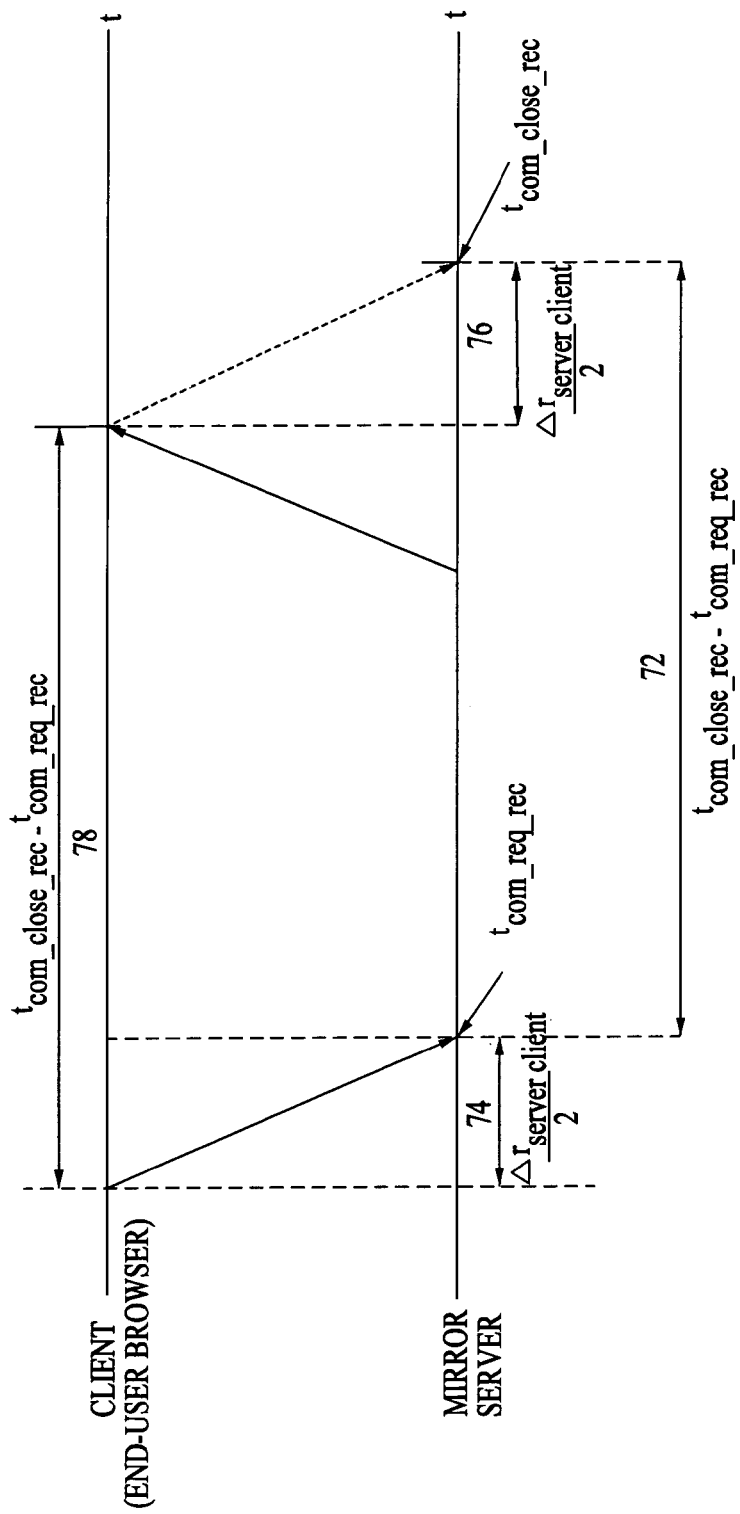
FIG. 8 illustrates a graphical representation of how HTTP information can be used to estimate to overall response time observed by the end-user according to embodiments of the present invention.

FIG. 8 illustrates a graphical representation of the above equation according to embodiments of the present invention. If the server delay ($t_{con\_close\_rec} - t_{con\_req\_rec}$) (see reference character 72) is added to the network delay during connection establishment $\Delta r_{server,client}/2$ (see reference character 74), and the network delay during connection close is subtracted $\Delta r_{server,client}/2$ (see reference character 76), the overall response time seen by the end-user (see reference character 78) can be estimated. Note that in the above equation, the delay represented by reference characters 74 and 76 may not, in fact, cancel, but in alternative embodiments, because the computed overall response time is only an estimation, it can be assumed that they do cancel.

For persistent connections with pipelining, according to embodiments of the present invention the overall response time can be estimated in a manner similar to the case of persistent connections without pipelining, as $$t_{con\_close\_rec} - t_{con\_req\_rec}.$$

Estimating the Response Time Observed by a Client During a Page Retrieval

Retrieval of a page consists of the retrieval of an HTML document followed by the set of objects within that document. This process may be performed in single or multiple HTTP connections. Because the content of an HTML document is known, it is also known which objects a browser may request. Thus, using the server logs, the time at which all objects are sent by the user can be determined. By using the server logs and the round trip delay estimations as described above, the total response time observed by the client can be determined.

Note, however, that if a request for all objects within the page does not arrive at the mirror server due to the caching of some objects in proxy servers or the client itself, the response time estimation is not trivial. A limit period must be established such that if a new connection/object request does not arrive at the mirror server within this limit period, it can be assumed that the client already has the remaining objects within the HTML document. Assuming that the client will not sit idle between the object requests, the limit period can be established as limit=$\Delta r_{server,client}$.

In embodiments of the present invention, if, after waiting limit units of time after the last request for an object in a given page is served, and no further requests were received, the overall response time estimation process may be terminated, and it can be assumed that the entire page has been delivered to the client. In other words, if an object is cached or is stored in a proxy server, a request for that object will never be received by the mirror server. The estimation process should not wait indefinitely for that request, because it will never be received. Thus, if the process waits a period of time equivalent to the round trip delay time, and no requests for any objects are received, it can be assumes that the request for that object has already been served by the cache or proxy server.

Note that if there were no objects in the cache or proxy server, it should take no longer than the round trip delay time to fetch an object from the mirror server. Thus, by waiting no longer than the round trip delay time for a particular object, the process essentially accounts for the time it would take for the mirror server to process a request for that object. Thus, the wait time can be included in the estimated response time observed by an end-user or client.

Therefore, embodiments of the present invention provide a system and method for redirecting end-users to mirror servers in the same region as the requesting end-user, or other regions, using assignments that minimize the overall response time seen by users of the content delivery system. Embodiments of the present invention also provide a system and method for redirecting end-users to mirror servers using assignments that balances the loads of the mirror servers while taking into account load capability.

In addition, embodiments of the present invention provide a system and method for redirecting end-users to mirror servers using assignments that minimize the overall response time seen by users of the content delivery system, wherein an increase in resources due to the addition of a new mirror server or the service termination of a customer content provider will not cause a load redistribution unless load balancing constraints are violated. Furthermore, in embodiments of the present invention, a new customer content provider will be added only if the overall response time is maintained below a specified threshold, and changes to the loads or existing customers will not change the overall response time so significantly that it exceeds a specified threshold.

What is claimed is:

1. In a content delivery system having m servers, S'={$S_1, \ldots, S_m$}, n active customers, C'={$C_1, \ldots, C_n$}, and g geographic locations, G'={$G_1, \ldots, G_g$}, wherein $sdel_k$ is a server delay of server $S_k$, $ndel_{j,k}$ is a network delay observed by customers in geographic location $G_j$ while retrieving content from server $S_k$, $p_j$ is a priority value for customer $C_i$, $c_i$ is a total load of customer $C_i$, $u_{i,j}$ is a fraction of requests coming to customer $C_i$ from region $G_j$, $a_{i,j,k}$ is a mapping representing a fraction of requests coming to customer $C_i$ from region $G_j$ that have been redirected to server $S_k$, and $s_k$ represents a load capacity of server $S_k$, a method for distributing server loads, the method comprising the steps of:

representing an average prioritized observed response time as $$AORT = \frac{\sum_{i=1}^{n}\sum_{j=1}^{g}\sum_{k=1}^{m} a_{i,j,k} \times u_{i,j} \times c_i \times p_i \times (sdel_k + ndel_{j,k})}{\sum_{i=1}^{n} c_i \times P_i};$$

generating a mapping that assigns requests from customers to a particular server while minimizing AORT; and
assigning requests to the particular server based on the generated mapping.

2. The method as recited in claim 1, wherein the assigning further including the step of assigning all requests from all customers in all regions to a particular server such that, for each $$C_i \in C', G_g \in G', \sum_{k=1}^{m} a_{i,j,k} = 1.0.$$

3. The method as recited in claim 1, wherein the assigning step assigns requests to a particular server while ensuring that the load capacity of each server is not exceeded such that, for each for each $S_k \in S'$, $$S_k \in S', \sum_{i=1}^{n}\sum_{j=1}^{g} a_{i,j,k} \times u_{i,j} \times c_i \leq s_k.$$

4. The method as recited in claim 1, wherein the assigning step includes assigning requests to a particular server while balancing the load of each server to within a maximum allowed deviation from a balanced state $\Theta$ such that, for all pairs of servers, $S_k$ and $$\frac{\sum_{i=1}^{n}\sum_{j=1}^{g} a_{i,j,k} \times u_{i,j} \times c_i}{\sum_{i=1}^{n}\sum_{j=1}^{g} a_{i,j,l} \times u_{i,j} \times c_i} \leq (1+\Theta) \times \frac{s_k}{s_l}.$$

5. The method as recited in claim 4, wherein if the content delivery system should add one or more servers, or remove one or more customers, the load of each server will not be redistributed unless the maximum allowed deviation from a balanced state $\Theta$ is exceeded.

6. The method as recited in claim 1, further including the step of adding one or more customers to the content delivery system only if $AORT_{new} \leq (1+\Phi) \times AORT_{old}$:

wherein $AORT_{old}$ and $AORT_{new}$ are old and new values of AORT defined as $$AORT_{old} = \frac{\sum_{i=1}^{n}\sum_{j=1}^{g}\sum_{k=1}^{m} a_{i,j,k} \times u_{i,j} \times c_i \times (sdel_k + ndel_{j,k})}{\sum_{i=1}^{n} c_i}$$

and $$AORT_{new} = \frac{\sum_{i=1}^{n}\sum_{j=1}^{g}\sum_{k=1}^{m} a'_{i,j,k} \times u_{i,j} \times c_i \times (sdel_k + ndel_{j,k})}{\sum_{i=1}^{n} c_i};$$

wherein $a'_{i,j,k}$ is a new mapping resulting from the addition of one or more customers; and wherein $\Phi$ is an allowable change in AORT for existing clients.

7. The method as recited in claim 1, further including the step of using a linear constraint solver to generate the mapping.

8. The method as recited in claim 1, further including the step of using a non-linear constraint solver to generate the mapping.

9. The method as recited in claim 1, further including the step of using a heuristic algorithm to generate the mapping, the heuristic algorithm comprising the step of assigning large $a_{i,j,k}$ values to small $u_{i,j} \times c_i \times (sdel_k + ndel_{j,k})$ values to produce a smaller overall AORT value.

10. The method as recited in claim 9, the heuristic algorithm comprising the steps of:

generating a plurality of sorted lists by sorting $C_i$ values in increasing order of $c_i$, sorting $<C_i,G_j>$ pairs in increasing order of $u_{i,j}$, sorting $S_k$ values in increasing order of $sdel_k$, and sorting $<G_j,S_k>$ pairs in increasing order of $ndel_{j,k}$;

starting with a top-most, smallest value item in each list, identifying comparable smallest-value items from the other lists to generate a plurality of $<C_i,G_j,S_k>$ triples equivalent to the number of sorted lists;

selecting from the plurality of $<C_i,G_j,S_k>$ triples, the $<C_i,G_j,S_k>$ triple with the smallest $u_{i,j} \times c_i \times (sdel_k + ndel_{j,k})$ value;

assigning to a server $S_k$ of the selected $<C_i,G_j,S_k>$ triple a remaining load from the $<C_i,G_j>$ pair; and repeating the heuristic algorithm starting with generating the plurality of sorted lists, taking into account the changes in the values of the $C_i$ values and the $<C_i,G_j>$ pairs as a result of the previous server assignment during each iteration, until the load from all $<C_i,G_j>$ pairs has been assigned to a server $S_k$;

wherein if, during any iteration of the heuristic algorithm, the load capacity of the server $S_k$ is not sufficient to handle the remaining load, the remaining load capacity of the server $S_k$ is assigned to some of the load of the $<C_i,G_j>$ pair, and an unassigned portion of the load from the $<C_i,G_j>$ pair is reinserted into the iterative process.

11. The method as recited in claim 10, the heuristic algorithm further including the steps of:

generating a load-capacity prioritized sorted list by sorting $C_i$ values in decreasing order of remaining load capacity $s_k$;

starting with a top-most, largest value item in the load-capacity prioritized list, identifying comparable smallest-value items from the other lists to generate a load-capacity prioritized $<C_i,G_j,S_k>$ triple;

considering the load-capacity prioritized $<C_i,G_j,S_k>$ triple in the selection of the top-most $<C_i,G_j,S_k>$ triple with the smallest $u_{i,j} \times c_i \times (sdel_k + ndel_{j,k})$ value; and repeating the heuristic algorithm starting with generating the plurality of sorted lists, taking into account the changes in the values of the $C_i$ values, the $<C_i,G_j>$ pairs, and remaining load capacity as a result of the previous server assignment during each iteration, until the load from all $<C_i,G_j>$ pairs has been assigned to a server $S_k$.

12. The method as recited in claim 10, the heuristic algorithm further including the steps of:

generating a list of content-available $<C_i,S_k>$ pairs in which the content of customer $C_i$ is stored in server $S_k$; and selecting the $<C_i,G_j,S_k>$ triple with the smallest $u_{i,j} \times c_i \times (sdel_k + ndel_{j,k})$ value that is also part of the list of content-available $<C_i,S_k>$ pairs;

wherein if, during any iteration of the heuristic algorithm, there is no $<C_i,G_j,S_k>$ triple that is also part of the list of content-available $<C_i,S_k>$ pairs, a suitable $<C_i,G_j,S_k>$ triple with the smallest $u_{i,j} \times c_i \times (sdel_k + ndel_{j,k})$ value is chosen and the data of customer $C_i$ is migrated to server $S_k$.

13. The method as recited in claim 12, the heuristic algorithm further including the step of generating a list of content-unavailable $<C_i,S_k>$ pairs in increasing order of migration time penalty for which the content of customer $C_i$ is not stored in server $S_k$;

wherein if, during any iteration of the heuristic algorithm, there is no $<C_i,G_j,S_k>$ triple that is also part of the list of content-available $<C_i,S_k>$ pairs, a suitable $<C_i,G_j,S_k>$ triple with the smallest combined $u_{i,j} \times c_i \times (sdel_k + ndel_{j,k})$ value and $<C_i,S_k>$ migration time penalty is chosen and the data of customer $C_i$ is migrated to server $S_k$.

14. The method as recited in claim 1, further including the step of estimating $ndel_{j,k}$ for non-persistent connections using HTTP logs, the step of estimating $ndel_{j,k}$ for non-persistent connections using HTTP logs comprising the steps of:

computing an estimated round trip delay $\Delta r_{server,client}$ as $t_{con\_req\_rec}(i+1) - t_{resp\_send\_end}(i)$ from information stored in the HTTP logs, where $t_{con\_req\_rec}(i+1)$ represents a time at which a connection request message is received by the server for an $(i+1)^{th}$ object, and $t_{resp\_send\_end}(i)$ represents a time at which the server stops sending an $i^{th}$ object; and computing the response time as $$(t_{resp\_send\_end} - t_{con\_req\_rec}) + 2 \times \frac{\Delta r_{server,client}}{2},$$

where $t_{con\_req\_rec}$ represents a time at which a connection request message is received by the server for an object, and $t_{resp\_send\_end}$ represents a time at which the server stops sending the object.

15. The method as recited in claim 1, further including the step of estimating $ndel_{j,k}$ for persistent connections using HTTP logs, the step of estimating $ndel_{j,k}$ for persistent connections using HTTP logs comprising the steps of:

computing an estimated round trip delay $\Delta r_{server,client}$ as $t_{con\_close\_rec} - t_{resp\_send\_end}(last)$, where $t_{con\_close\_rec}$ represents a time at which the server receives a request to close the persistent connection, and $t_{resp\_send\_end}(last)$ represents a time at which the server stops sending a response for a last request; and computing the response time as $$(t_{con\_close\_rec} - t_{con\_req\_rec}) + \frac{\Delta r_{server,client}}{2} - \frac{\Delta r_{server,client}}{2},$$

where $t_{con\_req\_rec}$ represents a connection request time.

16. A method for estimating a response time observed by a requesting entity in a geographic location while retrieving objects from a server through a non-persistent connection using HTTP logs, the method comprising the steps of:

computing an estimated round trip delay $\Delta r_{server,client}$ as $t_{con\_req\_rec}(i+1) - t_{resp\_send\_end}(i)$ from information stored in the HTTP logs, where $t_{con\_req\_rec}(i+1)$ represents a time at which a connection request message is received by the server from the requesting entity for an $(i+1)^{th}$ object, and $t_{resp\_send\_end}(i)$ represents a time at which the server stops sending an $i^{th}$ object to the requesting entity; and computing the response time as $$(t_{resp\_send\_end} - t_{con\_req\_rec}) + 2 \times \frac{\Delta r_{server,client}}{2},$$

where $t_{con\_req\_rec}$ represents a time at which a connection request message is received by the server from the requesting entity for an object, and $t_{resp\_send\_end}$ represents a time at which the server stops sending the object to the requesting entity.

17. A method for estimating a response time observed by a requesting entity in a geographic location while retrieving objects from a server through a persistent connection using HTTP logs, the method comprising the steps of:

computing an estimated round trip delay $\Delta r_{server,client}$ as $t_{con\_close\_rec} - t_{resp\_send\_end}(last)$, where $t_{con\_close\_rec}$ represents a time at which the server receives a request to close the persistent connection, and $t_{resp\_send\_end}(last)$ represents a time at which the server stops sending a response for a last request; and computing the response time as $$(t_{con\_close\_rec} - t_{con\_req\_rec}) + \frac{\Delta r_{server,client}}{2} - \frac{\Delta r_{server,client}}{2},$$

where $t_{con\_req\_rec}$ represents a connection request time.

18. In a content delivery network having m servers, $S' = \{S_1, \ldots, S_m\}$, n active customers, $C' = \{C_1, \ldots, C_n\}$, and g geographic locations, $G' = \{G_1, \ldots, G_g\}$, a content delivery system for distributing server loads, the content delivery system comprising:

memory for storing a server delay $sdel_k$ of server $S_k$, a network delay $ndel_{j,k}$ observed by customers in geographic location $G_j$ while retrieving content from server $S_k$, a priority value $p_i$ for customer $C_i$, a total load $c_i$ of customer $C_i$, a fraction of requests $u_{i,j}$ coming to customer $C_i$ from region $G_j$, a mapping $a_{i,j,k}$ representing a fraction of requests coming to customer $C_i$ from region $G_j$ that have been redirected to server $S_k$, and a load capacity $s_k$ of server $S_k$; and a processor programmed for representing an average prioritized observed response time as $$AORT = \frac{\sum_{i=1}^{n} \sum_{j=1}^{g} \sum_{k=1}^{m} a_{i,j,k} \times u_{i,j} \times c_i \times p_i \times (sdel_k + ndel_{j,k})}{\sum_{i=1}^{n} c_i \times p_i},$$

generating a mapping that assigns requests from customers to a particular server while minimizing AORT and the processor further programmed for assigning requests to a particular server based on said mapping.

19. The system as recited in claim 18, the processor further programmed for assigning all requests from all customers in all regions to a particular server such that, for each $C_i \epsilon C'$, $G_g \epsilon G'$, $$C_i \in C', G_g \in G', \sum_{k=1}^{m} a_{i,j,k} = 1.0.$$

20. The system as recited in claim 18, the processor further programmed for assigning requests to a particular server while ensuring that the load capacity of each server is not exceeded such that, for each for each $S_k \epsilon S'$, $$\sum_{i=1}^{n} \sum_{j=1}^{g} a_{i,j,k} \times u_{i,j} \times c_i \leq s_k.$$

21. The system as recited in claim 18, the processor further programmed for assigning requests to a particular server while balancing the load of each server to within a maximum allowed deviation from a balanced state $\Theta$ such that, for all pairs of servers, $S_k$ and $S_l$, $$\frac{\sum_{i=1}^{n} \sum_{j=1}^{g} a_{i,j,k} \times u_{i,j} \times c_i}{\sum_{i=1}^{n} \sum_{j=1}^{g} a_{i,j,l} \times u_{i,j} \times c_i} \leq (1 + \Theta) \times \frac{s_k}{s_l}.$$

22. The system as recited in claim 21, wherein if the content delivery system should add one or more servers, or remove one or more customers, the processor is further programmed for not redistributing the load of each server unless the maximum allowed deviation from a balanced state $\Theta$ is exceeded.

23. The system as recited in claim 18, wherein the processor is programmed for allowing one or more customers to be added to the content delivery system only if $AORT_{new} \leq (1+\Phi) \times AORT_{old}$:

wherein $AORT_{old}$ and $AORT_{new}$ are old and new values of AORT defined as $$AORT_{old} = \frac{\sum_{i=1}^{n} \sum_{j=1}^{g} \sum_{k=1}^{m} a_{i,j,k} \times u_{i,j} \times c_i \times (sdel_k + ndel_{j,k})}{\sum_{i=1}^{n} c_i}$$

and $$AORT_{new} = \frac{\sum_{i=1}^{n}\sum_{j=1}^{g}\sum_{k=1}^{m} a'_{i,j,k} \times u_{i,j} \times c_i \times (sdel_k + ndel_{j,k})}{\sum_{i=1}^{n} c_i};$$

wherein $a'_{i,j,k}$ is a new mapping resulting from the addition of one or more customers; and wherein $\Phi$ is an allowable change in AORT for existing clients.

24. The system as recited in claim 18, the processor further programmed for using a linear constraint solver to generate the mapping.

25. The system as recited in claim 18, the processor further programmed for using a non-linear constraint solver to generate the mapping.

26. The system as recited in claim 18, the processor further programmed for generating the mapping by assigning large $a_{i,j,k}$ values to small $u_{i,j} \times c_i \times (sdel_k+ndel_{j,k})$ values to produce a smaller overall AORT value.

27. The system as recited in claim 26, the processor further programmed for:
   generating a plurality of sorted lists by sorting $C_i$ values in increasing order of $c_1$, sorting $<C_i,G_j>$ pairs in increasing order of $u_{i,j}$, sorting $S_k$ values in increasing order of $sdel_k$, and sorting $<G_j,S_k>$ pairs in increasing order of $ndel_{j,k}$;
   starting with a top-most, smallest value item in each list, identifying comparable smallest-value items from the other lists to generate a plurality of $<C_i,G_j,S_k>$ triples equivalent to the number of sorted lists;
   selecting from the plurality of $<C_i,G_j,S_k>$ triples, the $<C_i,G_j,S_k>$ triple with the smallest $u_{i,j} \times c_i \times (sdel_k+ndel_{j,k})$ value;
   assigning to a server $S_k$ of the selected $<C_i,G_j,S_k>$ triple a remaining load from the $<C_i,G_j>$ pair; and
   repeating the heuristic algorithm starting with generating the plurality of sorted lists, taking into account the changes in the values of the $C_i$ values and the $<C_i,G_j>$ pairs as a result of the previous server assignment during each iteration, until the load from all $<C_i,G_j>$ pairs has been assigned to a server $S_k$;
   wherein if, during any iteration of the heuristic algorithm, the load capacity of the server $S_k$ is not sufficient to handle the remaining load, the remaining load capacity of the server $S_k$ is assigned to some of the load of the $<C_i,G_j>$ pair, and an unassigned portion of the load from the $<C_i,G_j>$ pair is reinserted into the iterative process.

28. The system as recited in claim 27, the processor further programmed for:
   generating a load-capacity prioritized sorted list by sorting $C_i$ values in decreasing order of remaining load capacity $s_k$;
   starting with a top-most, largest value item in the load-capacity prioritized list, identifying comparable smallest-value items from the other lists to generate a load-capacity prioritized $<C_i,G_j,S_k>$ triple;
   considering the load-capacity prioritized $<C_i,G_j,S_k>$ triple in the selection of the top-most $<C_i,G_j,S_k>$ triple with the smallest $u_{i,j} \times c_i \times (sdel_k+ndel_{j,k})$ value; and
   repeating the heuristic algorithm starting with generating the plurality of sorted lists, taking into account the changes in the values of the $C_i$ values, the $<C_i,G_j>$ pairs, and remaining load capacity as a result of the previous server assignment during each iteration, until the load from all $<C_i,G_j>$ pairs has been assigned to a server $S_k$.

29. The system as recited in claim 27, the processor further programmed for:
   generating a list of content-available $<C_i,S_k>$ pairs in which the content of customer $C_i$ is stored in server $S_k$; and
   selecting the $<C_i,G_j,S_k>$ triple with the smallest $u_{i,j} \times c_i \times (sdel_k+ndel_{j,k})$ value that is also part of the list of content-available $<C_i,S_k>$ pairs;
   wherein if, during any iteration of the heuristic algorithm, there is no $<C_i,G_j,S_k>$ triple that is also part of the list of content-available $<C_i,S_k>$ pairs, a suitable $<C_i,G_j,S_k>$ triple with the smallest $u_{i,j} \times c_i \times (sdel_k+ndel_{j,k})$ value is chosen and the data of customer $C_i$ is migrated to server $S_k$.

30. The system as recited in claim 29, the processor further programmed for generating a list of content-unavailable $<C_i,S_k>$ pairs in increasing order of migration time penalty for which the content of customer $C_i$ is not stored in server $S_k$;
   wherein if, during any iteration of the heuristic algorithm, there is no $<C_i,G_j,S_k>$ triple that is also part of the list of content-available $<C_i,S_k>$ pairs, the processor is further programmed for selecting a suitable $<C_i,G_j,S_k>$ triple with the smallest combined $u_{i,j} \times c_i \times (sdel_k+ndel_{j,k})$ value and $<C_i,S_k>$ migration time penalty, and migrating the data of customer $C_i$ to server $S_k$.

31. The system as recited in claim 18, the processor further programmed for estimating $ndel_{j,k}$ for non-persistent connections using HTTP logs by:
   computing an estimated round trip delay $\Delta r_{server,client}$ as $t_{con\_req\_rec}(i+1) - t_{resp\_send\_end}(i)$ from information stored in the HTTP logs, where $t_{con\_req\_rec}(i+1)$ represents a time at which a connection request message is received by the server for an $(i+1)^{th}$ object, and $t_{resp\_send\_end}(i)$ represents a time at which the server stops sending an $i^{th}$ object; and
   computing the response time as $$(t_{resp\_send\_end} - t_{con\_req\_rec}) + 2 \times \frac{\Delta r_{server,client}}{2},$$

where $t_{con\_req\_rec}$ represents a time at which a connection request message is received by the server for an object, and $t_{resp\_send\_end}$ represents a time at which the server stops sending the object.

32. The system as recited in claim 18, the processor further programmed for estimating $ndel_{j,k}$ for persistent connections using HTTP logs by:
   computing an estimated round trip delay $\Delta r_{server,client}$ as $t_{con\_close\_rec} - t_{resp\_send\_end}(last)$, where $t_{con\_close\_rec}$ represents a time at which the server receives a request to close the persistent connection, and $t_{resp\_send\_end}$ (last) represents a time at which the server stops sending a response for a last request; and
   computing the response time as $$(t_{con\_close\_rec} - t_{con\_req\_rec}) + \frac{\Delta r_{server,client}}{2} - \frac{\Delta r_{server,client}}{2},$$

where $t_{con\_req\_rec}$ represents a connection request time.

* * * * *